UNITED STATES PATENT OFFICE.

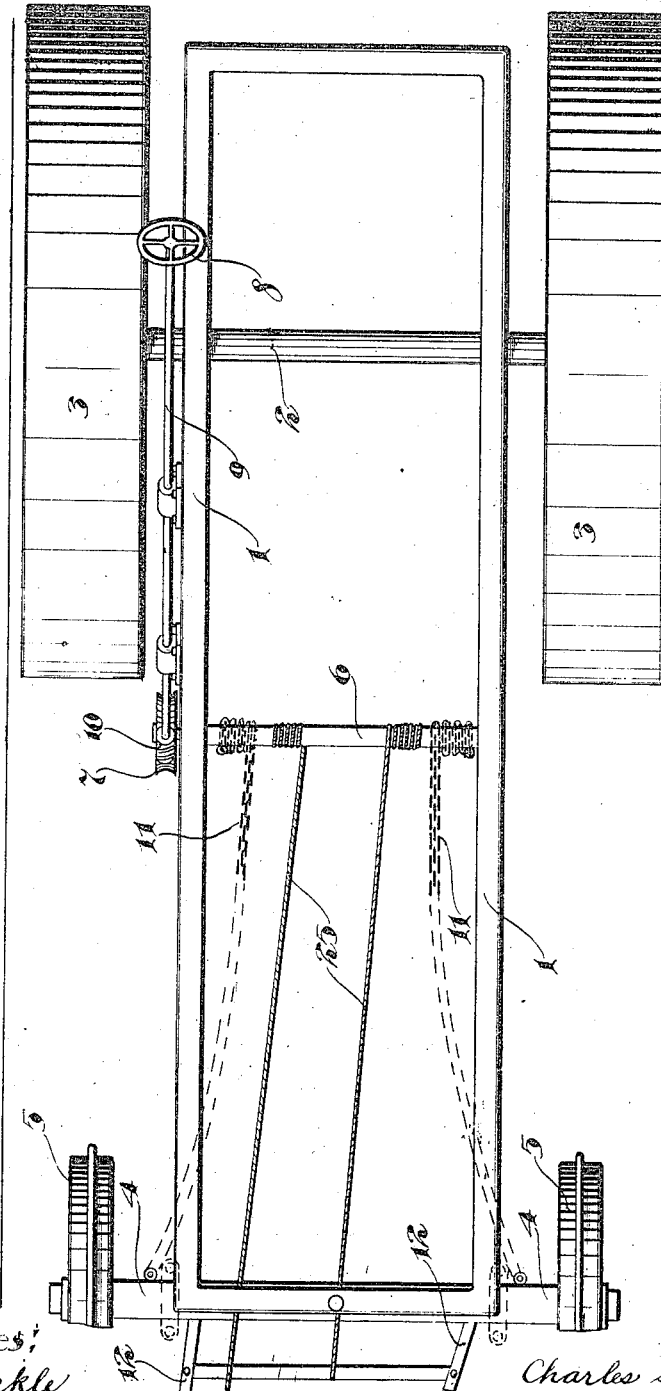

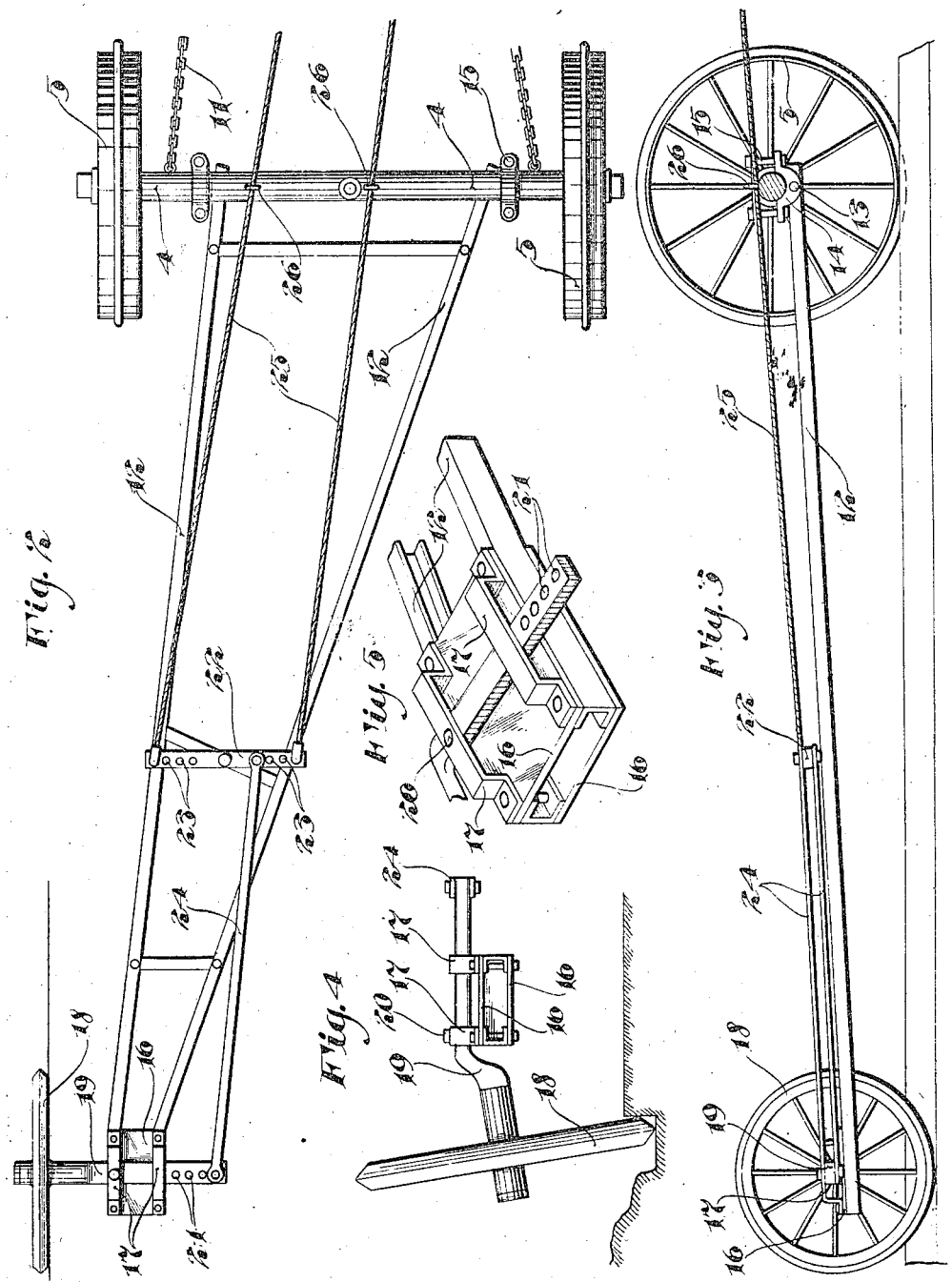

CHARLES S. WHITWORTH, OF CEDAR FALLS, IOWA.

STEERING DEVICE FOR TRACTION-ENGINES.

1,034,550.

Specification of Letters Patent.

Patented Aug. 6, 1912.

Application filed November 2, 1911. Serial No. 658,109.

*To all whom it may concern:*

Be it known that I, CHARLES S. WHITWORTH, a citizen of the United States, residing at Cedar Falls, in the county of Blackhawk and State of Iowa, have invented certain new and useful Improvements in Steering Devices for Traction-Engines; and I do hereby declare the following to be a full, clear, and exact description of the invention, such as will enable others skilled in the art to which it appertains to make and use the same.

My invention has for its object to provide an improved steering mechanism for traction engines, by the use of which, when desired, the steering of the engine may be accomplished automatically, but by the use of which also, when desired, the engine may be steered by the operator.

A steering mechanism of this kind is especially adaptable and serviceable in connection with traction engines used to draw gang plows, where, when following a furrow, the steering should be automatic, but at other times, it should be under the control of the operator.

The invention is illustrated in the accompanying drawings wherein like characters indicate like parts throughout the several views.

Referring to the drawings, Figure 1 is a plan view showing an ordinary traction engine, such as is frequently used in connection with gang plows, some parts being removed, but showing the manner of connecting my improved steering mechanism thereto; Fig. 2 is a plan view showing the front axle and the steering attachment and coöperating connections applied thereto in accordance with my invention; Fig. 3 is a side elevation of the parts shown in Fig. 2; Fig. 4 is a detail view in front elevation showing the guide wheel, its axle and the front end of the guide arm to which said axle is pivoted; and Fig. 5 is a perspective view with parts broken away, illustrating the pivotal connection between the front end of the guide arm and the axle of the guide wheel.

Of the parts of the traction engine, the numeral 1 indicates the main frame, the numeral 2 the rear axle, the numeral 3 the rear or traction wheels, the numeral 4 the pivoted front axle, and the numeral 5 the front wheels. The numeral 6 indicates a transversely extended windlass shaft suitably journaled in the sides of the frame 1, and provided at one end with a worm gear 7. The numeral 8 indicates the hand-operated steering wheel having a rod 9 journaled in suitable bearings on the side of the frame 1, and provided with a worm 10 that meshes with the worm gear 7. The numeral 11 indicates steering chains attached at their front ends to the pivoted front axle, and at their rear ends attached to and reversely wound upon the windlass shaft 6. The parts so far specifically noted are those of an ordinary traction engine. The so-called guide arm which carries the guide wheel, at its front end, extends forward from the front axle 4 of the traction engine and is hinged thereto for vertical movements, but partakes of the horizontal oscillatory movements of the said axle. This guide arm, as shown, is in the form of a forwardly converging skeleton frame 12, the longitudinal bars of which, at their rear ends, are pivoted at 13 to the bottom members of pairs of clamping heads 14 rigidly but detachably secured to the axle 4 by nut-equipped bolts 15. To the front ends of the pairs of frame or arm bars 12, upper and lower tie plates 16 are riveted, or otherwise rigidly secured by bolts or nuts, and to the top tie plate 16, offset metal guide straps 17 are rigidly attached.

The guide wheel 18, which is adapted to run either in the furrow or on level ground, is journaled on the inclined trunnion or end of a guide axle 19, which is in the form of a lever and is passed between the top tie plates 16 and the overlying guide straps 17, and is pivoted at 20 to one of the said guide straps, and to the said top plate. The other end of the lever projects beyond the top plate 16 and is provided, preferably, with a multiplicity of longitudinally spaced perforations 21.

On one of the transverse intermediate bars of the frame 12, a lever 22 is intermediately pivoted. The ends of this lever 22 are preferably provided with longitudinally spaced perforations 23. One side of the lever 22 is connected to the perforated end of the axle 19 by a connecting rod 24. Guide cables 25 are attached at their front ends to the opposite perforated ends of the lever 22, and are, as shown, passed rearward through guides 26 on the axle 4, and at their rear ends, are attached to and adapted to be reversely wound upon the windlass shaft 6 of the ordinary or primary steering mechanism.

The operation of the improved steering mechanism is substantially as follows: The cables 25 should normally be quite taut, while the cables 11 should normally be considerably slack in one or the other, or both thereof. In driving the machine over the field, or for that matter, at any time when the so-called guide wheel 18 is in contact with the ground and not in a furrow, the engine may be steered at will, either straight ahead or on the curve or turn, simply by manipulation of the ordinary steering wheel 8, substantially in the usual way. The importance of the arrangement is, however, that the guide wheel 18 will be set at the proper angle for the desired direction of travel, by pivotal movements of its axle 19, so that it may be kept in contact with the ground when out of the furrow, as well as when in a furrow. Without this arrangement for moving the axle 19, it will be necessary always to raise the guide wheel out of contact with the ground when the engine is to be turned around or at any other time except when following the furrow. In following a furrow in the plowing action, the guide wheel 18 runs in the furrow and by slight adjustments of its axle 19, it may be set so that it will hug one side of the furrow with the desired side thrust.

Of course, the engine may be steered by manipulation of the steering wheel 8, even if the main or primary cables 11 were disconnected, but it is desirable to leave the same connected so that in running over the roads for a considerable distance, the automatic steering attachment may be removed from the engine. When both pairs of steering cables are attached, the two coöperate under manipulation of the steering wheel 8, but the cables 25 to the attachment being taut, render the attachment more sensitive and more quickly responsive to the movements of the said steering mechanism. This action is desirable because when the steering mechanism is set to automatically follow a furrow, or when it is desired to slightly adjust the guide wheel when running in a furrow, this may be done without requiring sufficient movement of the steering wheel 8 to affect the front axle 4 through the chains 11.

The adjustable connections between the axle 19, lever 22, connecting rod 24 and cables 25 permit the guide wheel 18 to be set at the desired angle in respect to the front wheels 5.

The purpose of hinging the guide arms or frame 12 to the front axle is, of course, to permit the guide wheel 18 to follow irregularities in the ground or in the furrow, and to run over obstacles.

What I claim is:

1. The combination with a traction engine having a pivoted front axle, a windlass shaft and steering wheel with connections for moving said windlass shaft to steer said front axle, of a steering attachment comprising a forwardly projecting guide arm partaking of the horizontal pivotal movements of said axle, a guide axle pivoted to the front end of said guide arm, a guide wheel journaled on one end of said guide axle, and independent steering connections between said guide axle and the said windlass shaft, said independent connections having a common controller or operating device, substantially as described.

2. The combination with a traction engine having a pivoted front axle and means to steer said axle, of a forwardly projecting guide arm partaking of the horizontal pivotal movements of said axle, a horizontal guide axle intermediately pivoted to the front end of said guide arm, a guide wheel journaled on one end of said guide axle, and an operating connection extending from the other end of said guide axle rearward and connected to said means for steering the front axle.

3. The combination with a traction engine having a pivoted wheel-equipped axle, of a guide arm extending from said axle but connected therewith for horizontal pivotal movements, a guide wheel connected to said guide arm for horizontal angular adjustments and different steering connections for pivotally moving said steering wheel and pivoted front axle, said connections having a common controller or operating device, and the said steering connections to said steering wheel being arranged to operate under less movement of said common controller than is required to render operative the steering connections to said pivoted axle.

4. The combination with a traction engine having a pivoted front axle, of a windlass shaft mounted thereon to steer said front axle, a guide arm connected to the front axle of said engine for horizontal pivotal movements therewith, a guide axle intermediately pivoted to the front end of said guide arm, a guide wheel journaled on one end of said guide axle, and operating connections intermediate of said guide axle and windlass shaft, including cables and levers and means for adjusting the same to vary or set the angularity of said guide wheel in respect to the front wheels of said engine.

5. The combination with a traction engine having a pivoted front axle, a windlass shaft and steering wheel with connections for moving said windlass shaft, of a steering attachment comprising a forwardly projecting guide arm partaking of the horizontal pivotal movements of said axle, a guide axle pivoted to the front end of the said guide arm, a guide wheel journaled on one end of said guide axle, a rod extending rearward from the other end of said guide axle, an intermediate lever to which the rear end of said rod is connected, and cables extended from the ends of said intermediate lever and reversely wound on said windlass shaft.

6. The combination with a traction engine having a pivoted front axle, a windlass shaft and steering wheel with connections for moving said windlass shaft to steer said front axle, of a steering attachment comprising a forwardly projecting guide arm partaking of the horizontal pivotal movements of said axle, an approximately horizontal intermediately pivoted guide axle associated with the front end of said guide arm, a guide wheel journaled on the end of said guide axle, and connections between said guide axle and the windlass shaft whereby the former can be actuated by the latter.

In testimony whereof I affix my signature in presence of two witnesses.

CHARLES S WHITWORTH.

Witnesses:
F. D. MERCHANT,
HARRY D. KILGORE.